W. V. CALLENDER.
DEVICE FOR REMOVING CRUSTS FROM PIPES.
APPLICATION FILED FEB. 15, 1918.
1,283,070.
Patented Oct. 29, 1918.
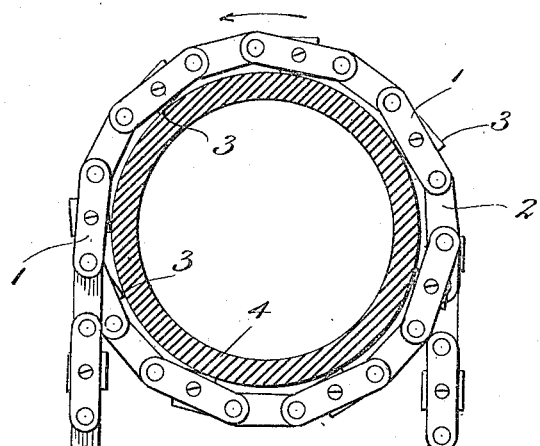
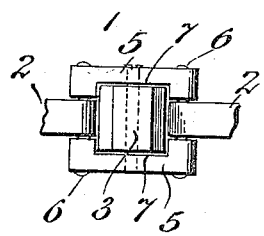
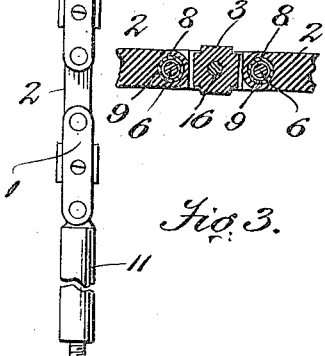
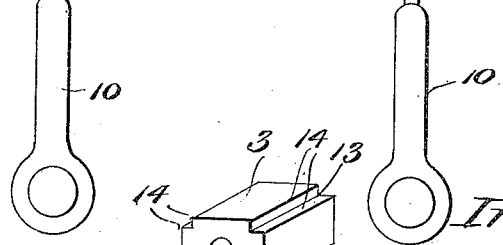
Inventor:
W. V. Callender,

UNITED STATES PATENT OFFICE.

WALLACE V. CALLENDER, OF CHICAGO, ILLINOIS.

DEVICE FOR REMOVING CRUSTS FROM PIPES.

1,283,070.  Specification of Letters Patent.  Patented Oct. 29, 1918.

Application filed February 15, 1918. Serial No. 217,375.

*To all whom it may concern:*

Be it known that I, WALLACE V. CALLENDER, a citizen of the United States, residing at Chicago, in the county of Cook and State of Illinois, have invented new and useful Improvements in Devices for Removing Crusts from Pipes, of which the following is a specification.

This invention relates to devices for cutting and removing the external crusts or deposits that form upon pipes, such as, for instance, those employed in artificial ice plants, fire tube and water tube boilers, etc.

The objects of my invention are to produce a comparatively inexpensive and simple device, the same being designed to operate in a rotary manner upon tubes and pipes and effectually remove, by cutting, all external crusts or deposits therefrom.

Other objects of the invention will hereinafter appear and be particularly pointed out in the appended claims.

Referring to the drawing:

Figure 1, illustrates a pipe or tube in cross section the same having applied thereto my improved device in the act of removing the crust therefrom;

Fig. 2, is a top plan view of a fragment of the device;

Fig. 3, a similar view in longitudinal section; and

Fig. 4, is a detail of one of the cutters or bits.

The device to be described is chain-like in its formation, and comprises a series of principal links 1, and connecting intermediate links 2, the principal links carrying the cutters or bits 3, having their cutting-edges so disposed that the device being wound one or more times about the tube or pipe 4, and manually reciprocated in alternate directions, will cut and remove all external crusts or deposits adhering to the tubes or pipes.

Each principal link of the device comprises a pair of opposite side-bars 5, the latter being connected near their ends by hardened rivets 6. Each side-bar is, furthermore, recessed as at 7, between its ends for the reception of the cutter or bit heretofore mentioned.

The connecting or intermediate links 2, are mere blocks provided near their ends with transverse holes 8, in each of which I preferably locate a hardened bushing 9 to receive the rivets 6 of the principal links. The bushings 9, are somewhat larger than or exceed slightly the diameters of the rivets 6, the object being to permit of a lateral flexibility of the device sufficient to permit the terminals of such device to approach each other when the device is wound one or more times about an incrusted tube or pipe.

The final links of the device may terminate in ordinary hand-holds 10, but I prefer that such links should terminate in internally threaded sockets 11, in which the shanks 12, of such hand-holds are adjustably threaded. By such an arrangement, the length of the device as a whole, may be increased and thus is capable of operating upon tubes or pipes intimately surrounded by obstructions, the increased lengthening of the device as thus described permitting the hand-holds to be located beyond such obstructions. Furthermore, the detachability of the hand-holds is advantageous, inasmuch as a removal of them or one of them will permit of the introduction of the device through spaces and openings otherwise impossible.

The cutters or bits are located in the angular recesses 7, formed in the inner sides of the opposing side-bars 5, of each principal link 1, and in this instance, are hardened cubical blocks having each of their four corners transversely and angularly recessed, as at 13, thus producing eight cutting edges 14, to each of said cutters or bits. A transverse aperture 15, is formed in each of the cutters or bits, and the same aline with a similar aperture formed transversely in the side-bars 5. Through these apertures is passed a screw 16, the same being hardened and constituting an axis for the cutter or bit. By removing the screw it will be obvious that the cutter or bit may be removed from its position in the principal link, partly rotated, so as to present a new set of cutting edges to the working side of the device, and the screw reinserted.

These cutters or bits are of slightly less length than the recesses 5 in the principal links in which they are located and operate so that, as a result of this proportioning, it will be seen that each cutter is capable of a partial rotation, or in other words, is capable of rocking on its axis as the device is moved back and forth upon the tube or pipe, such rocking movement being limited by the end-walls of the opening of the link in which it is mounted. This causes the cutters to be presented at a proper inclination to the work.

Other forms of cutters or bits may be substituted for those herein illustrated and described, but I prefer those shown by reason of the fact that they embody a multiplicity of cutting edges which may be successively brought into operative position by a very simple and easily made change. This increases the efficiency of the device as well as prolongs its life. Of course when all of the cutting edges of the cutters or bits have become worn and impaired new bits may be readily substituted.

In operation, as will be readily surmised, the flexible chain-like carrier is wound about the incrusted tube or pipe which it is desired to free from the deposit, both handles of the device are grasped and alternately pulled, so that the carrier is caused to reciprocate in alternately reverse direction and thus its wrapped portion travels in an annular path around the tube or pipe. The cutters or bits being engaged by the incrusted surface of the tube or pipe will, as the carrier moves in one direction, be tilted or inclined so that the angular cutting-edges will be presented at the proper inclination to effectively engage and tear loose the deposit. When the carrier moves in the opposite direction, as will be obvious, the cutters or bits will automatically reverse their positions and hence cut in the reverse direction. It will of course be understood that as the device is reciprocated it is gradually advanced along the pipe or tube.

What I claim is:

1. A device for the purpose described, comprising a chain-like carrier formed of a series of open links and adapted to be wound about a pipe or tube and alternately reciprocated in opposite directions, and cutters mounted and having a limited rocking movement in the openings in the links.

2. A device for the purpose described, comprising a chain-like carrier formed of open links and adapted to be wound about a pipe or tube and alternately reciprocated in opposite directions, and cutters provided with opposing cutting-edges and mounted and having a limited rocking-movement within the openings of said links.

3. A device for the purpose described, comprising a chain-like carrier formed of links and adapted to be wound about a pipe or tube and alternately reciprocated in opposite directions, and cutters mounted and adapted to rock within the links, said cutters being of cubical shape having their four corners grooved to form a series of transverse cutting-edges.

4. A device for the purpose described, comprising a chain-like carrier formed of links and adapted to be wound about a pipe or tube and alternately reciprocated in opposite directions, each of the principal links being provided with a rectangular recess, cubical cutters slightly smaller than and pivoted in said recesses and having a limited rocking motion and having their four transverse corners angularly grooved to produce a series of transverse angular cutting-edges.

5. A device for the purpose described, comprising a chain-like carrier formed of links and adapted to be wound about a pipe or tube and alternately reciprocated in opposite directions, each of the principal links comprising opposite recessed side-bars and connecting rivets, and each of the intermediate connecting-links being provided with apertures larger than and receiving said rivets, and cutters mounted in the recesses of the principal links and removable therefrom.

6. A device for the purpose described, comprising a chain-like carrier embodying a series of open links and adapted to be wound about a pipe or tube and alternately reciprocated in opposite directions, and cutters mounted in the openings in said links.

7. A device for the purpose described, comprising a chain-like carrier embodying a series of open links and adapted to be wound about a pipe or tube and alternately reciprocated in opposite directions, and cutters removably mounted in the openings in said links.

WALLACE V. CALLENDER.

Witnesses:
W. S. DUVALL,
E. E. ELLIS.

Copies of this patent may be obtained for five cents each, by addressing the "Commissioner of Patents, Washington, D. C."